H. M. AVERS.
Combined Cake-Cutter and Nutmeg-Grater.
No. 203,312. Patented May 7, 1878.
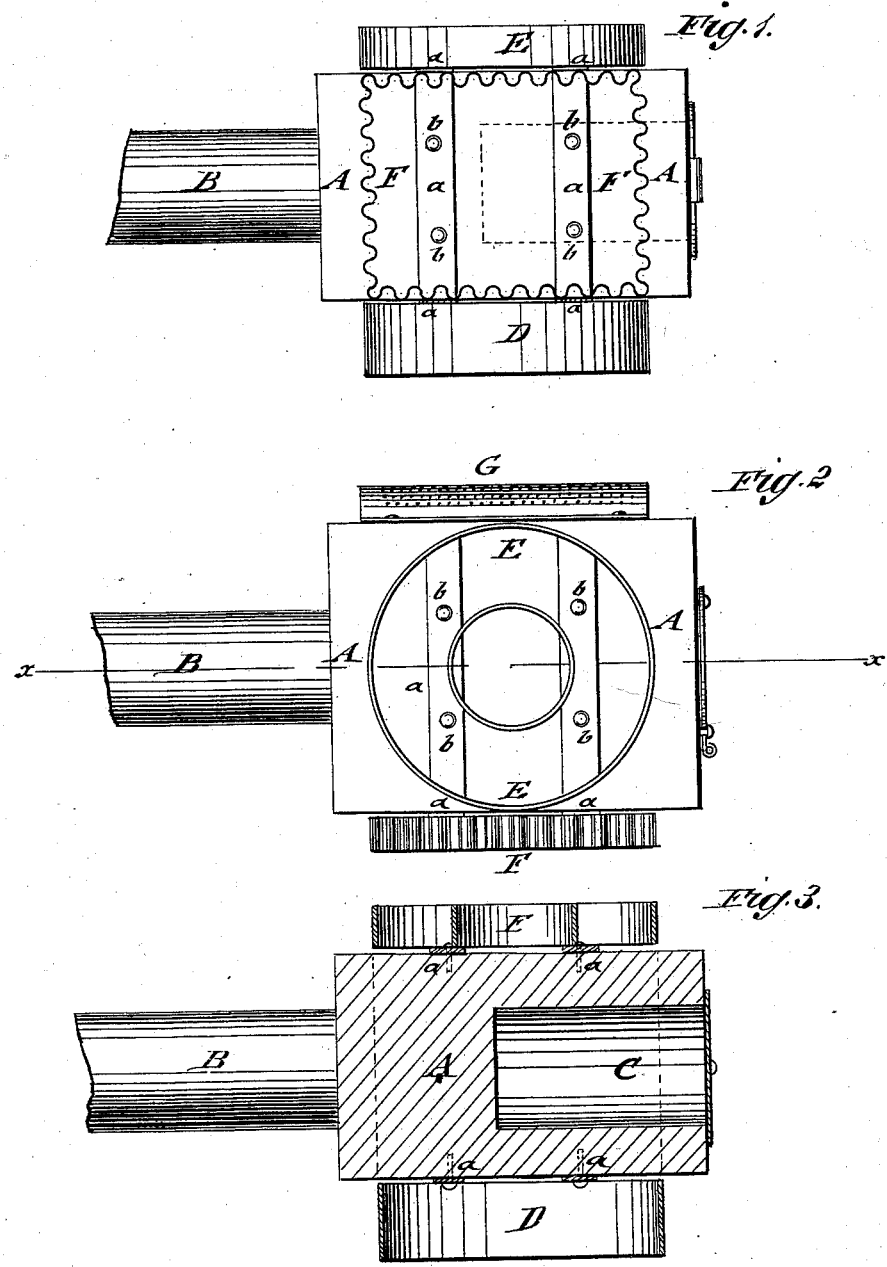

UNITED STATES PATENT OFFICE.

HERBERT M. AVERS, OF CHICAGO, ILLINOIS.

IMPROVEMENT IN COMBINED CAKE-CUTTER AND NUTMEG-GRATER.

Specification forming part of Letters Patent No. 203,312, dated May 7, 1878; application filed April 8, 1878.

*To all whom it may concern:*

Be it known that I, HERBERT M. AVERS, of Chicago, in the county of Cook and State of Illinois, have invented a new and Improved Combined Cake-Cutter and Nutmeg-Grater, of which the following is a specification:

In the accompanying drawings, Figures 1 and 2 are side elevations of my improved combination cake-cutter and nutmeg-grater; and Fig. 3 is a vertical longitudinal section of the same on line $x\ x$, Fig. 2.

Similar letters of reference indicate corresponding parts.

The object of this invention is to furnish, for the purpose of cutting cakes, doughnuts, biscuits, &c., and also for grating nutmegs and storing the same, an improved combination utensil, by which the different operations can be performed in easy manner, and in which the different parts are arranged in convenient and compact manner for use.

The invention consists of a block having at one end an interior cavity and lid for the nutmegs, and at the opposite end a handle for taking hold of the same, the sides being arranged with cake, doughnut, and biscuit cutting device, and with a nutmeg-grater.

Referring to the drawings, A represents a block of wood, of square, oblong, or other shape, that is provided with a handle, B, for taking hold of the same. In the front end of the block, opposite to the handle, is arranged a cavity, C, for the purpose of storing the nutmegs after use, the cavity being readily closed by a hinged or pivoted lid that is locked in suitable manner in closed position, so as to retain the nutmegs in the cavity.

To three sides of the block are applied, respectively, a cake-cutter, D, a doughnut-cutter, E, a biscuit-cutter, F, or other cutters, while to the fourth side a nutmeg-grater, G, is attached. The cutters are all secured to the block by means of cross-strips $a$ and fastening rivets or screws $b$, in such a manner as to leave small air-spaces at the parts where they adjoin the blocks, so as to admit the escape of the air when cutting out cakes and other objects.

The different cutters are so arranged on the sides that one does not interfere with the other, and that each may be used in convenient manner.

Having thus described my invention, I claim as new and desire to secure by Letters Patent—

1. A combination utensil consisting of a block made with a handle at one end and a storage-receptacle and lid for the nutmegs at the opposite end, and arranged with cake and other cutters and a nutmeg-grater at the sides of the block, substantially as shown and described.

2. The combination, in a combination utensil, of a supporting-block with cake and other cutters, applied by cross-strips and fastening devices in such a manner as to admit the escape of air between the cutters and blocks when cutting out the cakes, &c., substantially as set forth.

HERBERT MARKHAM AVERS.

Witnesses:
D. DAVIS,
J. H. AVERS.